United States Patent
Hild et al.

(10) Patent No.: US 7,117,361 B1
(45) Date of Patent: *Oct. 3, 2006

(54) METHOD OF TRANSMITTING INFORMATION DATA FROM A SENDER TO A RECEIVER VIA A TRANSCODER

(75) Inventors: Stefan Hild, Adliswil (CH); Luke O'Connor, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/743,857

(22) PCT Filed: Nov. 23, 1998

(86) PCT No.: PCT/IB98/01855

§ 371 (c)(1),
(2), (4) Date: Aug. 8, 2001

(87) PCT Pub. No.: WO00/03525

PCT Pub. Date: Jan. 20, 2000

(30) Foreign Application Priority Data

Jul. 13, 1998 (EP) .................................. 98112938

(51) Int. Cl.
*H04L 9/00* (2006.01)

(52) U.S. Cl. ..................................... 713/161; 713/181

(58) Field of Classification Search ................ 713/189, 713/161, 181, 160; 375/220

See application file for complete search history.

(56) References Cited

U.S. PATENT DOCUMENTS

| 5,497,396 A | 3/1996 | Delprat |
| 6,763,460 B1 * | 7/2004 | Hild et al. ................... 713/161 |

FOREIGN PATENT DOCUMENTS

| EP | 0 811 939 A2 | 10/1997 |
| EP | 0 872 990 A1 | 10/1998 |
| EP | 0 811 939 A3 | 12/1998 |
| WO | WO 97/18635 A2 | 5/1997 |
| WO | WO 97/18635 A3 | 5/1997 |

* cited by examiner

*Primary Examiner*—Emmanuel L. Moise
*Assistant Examiner*—Jeffrey Popham
(74) *Attorney, Agent, or Firm*—Ference & Associates

(57) ABSTRACT

A method of transmitting information data from a sender to a receiver via a transcoder is proposed. The information data comprises confidential information data which is encrypted and non-confidential information data. Security information and transcoding-type information is sent together with the partly encrypted information data to the transcoder which uses the security information and transcoding-type information during a transcoding step. The encrypted confidential information data is thereby transcoded without using its content while the non-confidential information data is transcoded, having access to its content.

27 Claims, 1 Drawing Sheet

METHOD OF TRANSMITTING INFORMATION DATA FROM A SENDER TO A RECEIVER VIA A TRANSCODER

The invention relates to a method for transmitting data from a sender to a receiver via a transcoder, which means that the information data is altered and/or reduced before transmitting it to the receiver. The invention further relates to a method for transcoding the information data, particularly for transcoding the information data when it comprises encrypted confidential information data as well as non-confidential information data. The invention also relates to a method of receiving the transcoded information data at a receiver, particularly checking integrity of the information data and trustworthiness of the transcoder. Moreover, the invention relates to a sender, a transcoder and a receiver, combinable to perform transmitting of information data under use of transcoding functionality.

TECHNICAL FIELD AND BACKGROUND OF THE INVENTION

Today, internet-browsing via the world-wide-web is by and large confined to stationary users who have access to browsers running on powerful computing devices such as workstations or PCs. Such devices are not only linked to the Internet via reasonably high-speed and high-bandwidth data connections, but are also equipped with powerful software and hardware for processing and rendering accessible the received multi-media data. Authors make ample use of this infrastructure by creating webpages of ever-increasing complexity, both in terms of the data contents itself which may incorporate a large variety of audio and graphics formats, and executable contents such as applets for advanced functions such as payments, etc.

As users become more accustomed to relying on the web as a general-purpose information source, access to the web is becoming more desirable for users on-the-move, using devices such as mobile telephone handsets or small and lightweight hand-held computing devices. However, users of such devices face problems when trying to access the existing world-wide-web infrastructure: Mobile hand-held devices are connected to the Internet via an unusually slow and fragile data connection. This leads to unacceptably long down-load times for inefficiently formatted data streams.

The typical content-processing capabilities of these portable devices is poor as compared to PCs, as the available computing power is limited and the hardware used to display the retrieved content is unsophisticated. For example, a very simple mobile hand-held device may only be capable of representing text format.

Much of the content offered by servers through the Internet is constructed with the assumption that it will be processed and displayed on a relatively powerful computing device. The server could create several representations of the content where each representation is tailored to a specific computing device such as a pager, a mobile telephone handset, a laptop, a high-resolution PC and so on. However, this requires a significant amount of re-authoring since large portions of existing server content must be manually modified. Maintaining several copies of each single page is also undesirable.

An alternative solution is for the client to use a transcoder service. The function of a transcoder is to reformat content received from a server in order to reduce the amount of information which is to be transferred to the client, given the available restricted bandwidth between server and client, and to ensure that such the transferred data is representable at the client, given the display- and processing capabilities of the client. The transcoder therefore requires knowledge of the data link to the client, and also knowledge of the client's processing/display capabilities.

Common tasks that the transcoder might perform on content destined for the client include the removal of audio or graphic content, converting between graphics formats, compression and decompression, or converting from a marked-up language, such as HTML, into other data representations, e.g. speech.

Usually all content sent from the server to the client passes through the transcoder. To perform the transcoding, the transcoder requires unrestricted access to all data. As this may include security-sensitive information, the transcoder should therefore be considered a trusted party. Security may then be maintained by establishing a secure channel, for example, by using the Secure-Socket-Layer protocol, SSL, between the server and the transcoder, and a separate secure channel between the transcoder and the client, or by incorporating the transcoder within either the server or the client and using SSL between the two. If the transcoder cannot be trusted, then the transcoding service is limited to operating on content with little or no value.

Unfortunately, incorporating transcoder functionality into the server or client is unacceptable except for few, highly security-sensitive applications, since it involves upgrades to server software and usually server hardware. In addition, mobile devices evolve at high rates and transcoder functionality is likely to evolve at a similar rate, leading to tight software replacement cycles.

External transcoder services which may be offered as a commercial service by a hand-held-device manufacturer, a data network operator or an ISP, and which could be incorporated with existing proxy-servers, are clearly a more suitable and scaleable solution. Unfortunately, such third-party provided transcoders can rarely be viewed as trusted parties. Security must then be provided by applying end-to-end encryption between the server and the client, leaving the transcoder the impossible task of operating on the encrypted data stream.

In conjunction with existing end-to-end encryption methods, known transcoders cannot be used since they require plain-text access to the entire data stream. Their actions cannot be verified by the clients, thus making them even less applicable for security-sensitive data transfers.

A transcoder is e.g. described in U.S. Pat. No. 5,544,266. In U.S. Pat. No. 5,729,293, a device for transcoding coded digital signals which are representative of a sequence of images, which device comprises a variable length decoding channel followed by a variable length encoding and decoding channel, is described. A prediction sub-assembly is connected in cascade between these two channels, and this sub-assembly comprises, in series, between two subtracters a picture memory and a circuit for motion compensation in view of displacement vectors which are representative of the motion of each image. Other implementations are possible, and particularly a scaleable one in which said prediction sub-assembly comprises at least two and more generally a plurality of similar encoding and decoding channels arranged in cascade and corresponding to the same number of image quality levels.

U.S. Pat. No. 5,745,701 describes a system for interconnecting local networks via a public transmission network, in which equipment items of the microcomputer type, connected to a local network are capable of being connected to the public network by a router in order to communicate with one or more equipment items of the microcomputer type connected to at least one other local network, which are capable of being linked to the public network by a router. The system includes security protection of the establishment of the communications between the local networks over the public network, implementing a certificate exchange mechanism and the software procedures for active authentication, of the "challenge-response" type being placed in the routers. The described network would be a typical application field for using transcoding.

OBJECT AND ADVANTAGES OF THE INVENTION

It is an object of the invention according to claim 1 to provide a method for transmitting data from a sender to a receiver via a transcoder which allows using a non-trusted transcoder for transcoding information data which nevertheless can comprise encrypted confidential as well as non-confidential information data.

The method with the features according to claim 1 has the advantage that although confidential information data is transmitted in encrypted form, a transcoding can be done in that the non-confidential information data is transcoded and encrypted confidential information data may be transcoded in that it is removed. No trusted transcoder is necessary and also no additional communication connection between the sender and the receiver to transmit confidential information data.

When the partly encrypted information data is accompanied by a hashing-information allowing content-verification at the receiver of at least part of said partly encrypted information data, an additional security mechanism is thereby realized which hence increases the achievable transmission security and minimizes external fraudulent influence.

It proves of advantage when the information data is subdivided into information data pieces before encrypting and transmitting, since thereby a preciser and more fine-grained information data handling, particularly concerning its parameters can be achieved. Such a parameter is the security which tells, whether an information data piece is confidential or not. Another such parameter is the transcoding-type which tells which transcoding particularities apply to the respective information data, such particularities being e.g. whether the information data piece can be compressed or not, whether it can be omitted or not, a.s.o.

The above explained advantage is increased, when each information data piece is assigned its own piece security information part and piece transcoding-type information part, such that the information data pieces get their own assigned profile, here at least the security- and transcoding-type information. Then the transcoder can individually treat the information data according to its respective profile. Interdependencies between information data pieces is then eliminated.

When an information data piece is assigned its own piece hashing information part, said information data piece being preferably part of said non-confidential information data, again a finer granularity in security can be achieved. Since the hashing implies that the content of the respective information data is not to be altered, only a restricted transcoding functionality can be applied, namely only no transcoding or deletion. Therefore it proves of advantage that such hashing is restricted to the information data where it is in fact needed, such that a maximum transcoding effect can be achieved.

The piece security information parts and piece transcoding-type information parts can be translated into labels according to a translation policy and instead of said piece security information parts and piece transcoding-type information parts, said labels can be transmitted to said transcoder, whereby a policy information, explaining how to interpret said labels, is made available or is already available to the transcoder. The procedure reduces the information to be sent. This is true particularly, where a big number of piece security information parts and piece transcoding-type information parts is to be transmitted, because the saving of data achieved by using the shorter labels is then more and more dominating over the additional data represented by the policy information. This method is comparable to having a short identifier for long to explain actions, like acronyms. The policy information then tells what meaning lies behind the identifier or acronym.

The labels can then be combined in a security- and transcoding-type information packet which is completed by a signature allowing content-integrity-verification at the receiver. This has the advantage that the receiver can make sure if the security- and transcoding-type information packet has been modified or not. If the security- and transcoding-type information packet has not been modified, he can check, whether the received information data has been transcoded according to the rules contained in the security- and transcoding-type information packet. Otherwise he knows that the transcoder has acted incorrectly and that he should not trust the information data received.

It is an object of the invention according to claim 8 to provide a method for transcoding partly encrypted information data, according to the implied security, hence only accessing content of non-confidential information data.

This method with the features according to claim 8 allows in an advantageous manner to transcode the received information data without the need of being trusted. It therefore uses security information and transcoding-type information which tells the transcoder how to treat the incoming information data, namely which of the information data is encrypted and which is not and which transcoding policy it should pursue.

It is an object of the invention according to claim 13 to provide a method of receiving the transcoded information data at a receiver, whereby the compliance of the transcoder with security conditions and transcoding conditions can be tested.

The method with the features according to claim 13 has the advantage that the transcoder trustworthiness test is very simple and relies just on the same information as has used the transcoder for transcoding. Since the security and transcoding-type information is not mingled with the information data, an integrity check of the security and transcoding-type information is facilitated because no transcoding and hence altering access to the security and transcoding-type information is needed.

The use of labels as shortened version of the security- and transcoding-type information is particularly useful, when the therefor-used policy, which is also needed for interpreting the labels, is commonly used and maybe even standardized. Then, the policy information need not be transmitted with the information data but is already present in the transcoder, respectively the labels are understood therein automatically because the transcoder has already implemented the functionality corresponding to the labels. The policy can then be realized in the transcoder directly into the corresponding functionality, thereby avoiding a step of concrete interpretation. For example, when a label "NT" arrives, the transcoder could automatically perform no transcoding, since the transcoder has been programmed or determined to treat information data with this label the way that no transcoding shall be performed. The corresponding translation would hence be "NT"=no transcoding.

The security- and transcoding-type information packet offers all information which is needed for the transcoder to process the arriving information data correctly. Since the security- and transcoding-type information is not to undergo transcoding, this security- and transcoding-type information packet can be completed with a signature which allows to verify at the receiver if the content of the security- and transcoding-type information packet has been amended somewhere between sender and receiver. Fraudulent or erroneous modification of the security- and transcoding-type information packet can hence easily be recognized at the receiver, which makes the whole information data transmission more secure.

It is an object of the invention according to claim 19 to provide a sender for transmitting data to a receiver via a transcoder which allows using a non-trusted transcoder for transcoding information data which nevertheless can comprise encrypted confidential as well as non-confidential information data.

The sender with the features according to claim 19 has the advantage that although it only needs simple modification with respect to known senders, the advantages of transcoding can be combined with the advantages of secure transmission of security-sensitive, i.e. confidential information data.

A divisor means for subdividing the information data into information data pieces before encrypting and transmitting is relatively easy to implement. Text syntax or image data header information can be used to perform an automatic dividing.

It is an object of the invention according to claim 23 to provide a transcoder for transcoding partly encrypted information data, according to the implied security, hence only accessing content of non-confidential information data.

The transcoder with the features according to claim 23 has the advantage that it is receptive for information data containing encrypted and non-encrypted information data and that it can perform the optimum transcoding possible in that it does not try to access content of the encrypted information data but accesses the non-confidential information data for transcoding. The more the transcoder can dig into the information data, the higher can be the transcoding efficiency due to a preciser knowledge in the transcoder, which information can be reduced to which extent. However, encrypted information data is not accessible to such content analysis which is as intended by the sender. The necessary information how to treat which part of the information data, is derivable from the security- and transcoding-type information.

It is an object of the invention according to claim 25 to provide a receiver for receiving the transcoded information data at a receiver, whereby the compliance of the transcoder with security conditions and transcoding conditions can be tested.

The receiver with the features according to claim 25 has the advantage that it has full benefit of transcoding technique without needing to trust the transcoder or having a separate confidential-information communication line to the sender. Any not allowed modification of the information data on the way form the sender to the receiver is easily recognizable by utilizing the security- and transcoding-type information which itself has been protected against hidden modification. Unrecognized information data falsification is hence not possible, respectively counteracted using encryption technology which depending on the used encryption algorithm provides a very high security.

SUMMARY OF THE INVENTION

The problem solved is to facilitate secure end-to-end communication between a receiver, e.g. a client and a sender, e.g. a server, while still permitting an intermediate transcoding service to alter the content according to the capabilities and connectivity characteristics of the client. The proposed solution is based on the server considering its content as two types of information data, one of which should be protected for confidentiality, the other which is non-confidential or even public and can be subject to transcoding. This approach satisfies two goals:

It allows the application of transcoding techniques on a data stream containing security-sensitive data without requiring plain-text access to the security-sensitive data itself and the transcoding done by the transcoder is verifiable by the client.

The method allows a non-trusted transcoder service to operate on a security-relevant data stream without compromising the end-to-end encryption of the security-sensitive data items contained in the data stream.

The information data can be subdivided into a collection of fields, which are either of the confidential or non-confidential type.

In addition, the system is flexible in that the policy regarding the transcodability and security of individual data fields can be specified by the server.

Furthermore, the actions performed by the transcoder can be verified to the extent that the transcoder has only content modified according to a stated policy. The assumption made here is that the secure fields of the content require no transcoding.

The solution is applicable to scenarios where electronic commerce, on-line banking, or other security-sensitive applications are run on Tier-0 or Tier-1 clients with limited input or output capabilities and bandwidth-limited connections to the servers, without requiring the servers to install and maintain a dedicated and trusted transcoder function, or where rapid development cycles for new and improved device capabilities and therefore transcoder functions are expected and where independent transcoder-services are therefore preferred.

Starting from an original information data stream which is divided into data fields, also called information data pieces, the herein proposed method can comprise the following steps:

Inserting additional tags, respectively labels, into the original data stream that mark the data fields in terms of their transcodability, e.g. transcodable, non-transcodable, optional, critical, etc., and their security relevance, e.g. security-sensitive, not security-sensitive, etc., these labels being herein referred to as security labels or piece security information part label and piece transcoding-type information part labels.

Generating a policy document which defines the transcoder-allowed operations for each tag. This policy document or policy information hence provides for the explanation of what the labels mean, how they should be interpreted. This step can be left out if the policy is inherently known in the transcoder.

Separating the security-sensitive information fields and applying end-to-end encryption on those selectively and individually, leaving the non-security-sensitive information fields unencrypted.

Generating a document summary, also referred to as security- and transcoding-type information packet, based on the structure of the original input stream, hence including the security labels and transcoding-type labels.

Allowing the receiver, i.e. client to verify the transcoder actions by comparing the output of the transcoder with the document summary and the policy document.

DESCRIPTION OF THE DRAWINGS

Examples of the invention are depicted in the drawings and described in detail below by way of example. It is shown in FIG. 1 a system with a sender, a transcoder and a receiver.

The FIGURE is for sake of clarity not shown in real dimensions, nor are the relations between the dimensions shown in a realistic scale.

DETAILED DESCRIPTION OF THE INVENTION

Figure 1:
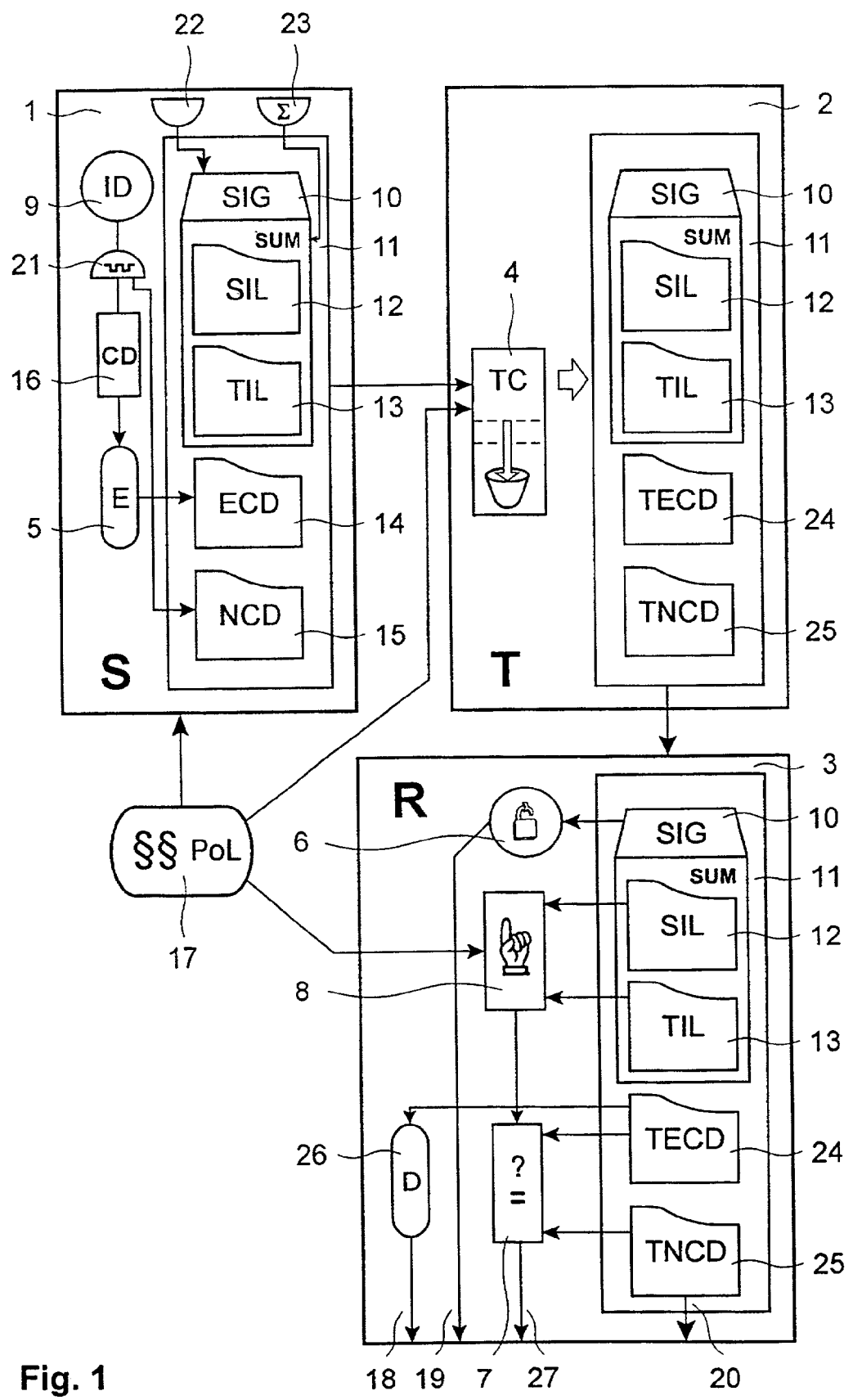

In the following, the various exemplary embodiments of the invention are described.

In FIG. 1, a sender 1, also called client, is connected via a communication connection, which need not be a physical connection, to a receiver 3 via a transcoder 2. A policy information 17 is accessible for the sender 1, the transcoder 2 and the receiver 3 as well.

The sender 1 comprises a divisor means 21 for subdividing information data 9, denoted with ID, which is to be sent to the receiver 3. The output of the divisor means 21 is confidential information data 16, denoted with CD, and non-confidential information data 15, short NCD. An encryptor 5 is arranged for encrypting the confidential information data 16 and delivers encrypted confidential information data 14, denoted with ECD. Furthermore, the sender 1 comprises a packetizer 23 and a signature generator 23.

The information data is herein referred to as a content D which can be decomposed into a collection of N content fields $f_1, f_2, \ldots, f_N$, also called information data pieces. Here a field may represent a text paragraph, an image, or data formatted in a table, for example. Further it may be the case that a given field $f_i$ is composed of several subfields $f_{i,1}, f_{i,2}, \ldots, f_{i,n}$ representing the fact that the content is hierarchical. For example, a paragraph field f; may consist of a text field, followed by a table field, followed by an image field, and then further text fields. Subfields may contain subfields and so on. The granularity of the field decomposition is at the discretion of the server. The decomposition is achieved via the divisor means 21, which here also sorts the fields according to their desired security.

After the field decomposition is complete, the server 1 then attaches or assigns two classes of labels to each field $f_i$. The first label class $L_s$ is a security label, also called piece security information part, which indicates whether the given field $f_i$ is to be encrypted at the time of transmission. For example, the set of possible security labels $L_s$ could be defined as $$L_s = \{\text{secure, non-secure}\} \quad (1)$$

and $L_s(f_i) \in L_s$ where $L_s(f_i)$ is the security label of $f_i$. The label $L_s$ could be extended in several ways such as to include, for example, levels of encryption, e.g. with short or long keys, to include authentication information or to include a signature.

The second label class $L_t$ is a transcoding label, also called piece transcoding-type information part, which indicates what action the transcoder 2 may take when a content field is received. For example a possible set of transcoding labels $L_t$ could be defined as $$L_t = \{\text{non-transcodable, transcodable, critical, non-critical}\} \quad (2)$$

where the exact meaning of these labels would be defined in a translation policy associated with the server 1. For example one such policy may be to interpret the transcoding labels $L_t$ as follows:

'transcodable' implies that the content field can be transcoded at the transcoder's discretion;

'non-transcodable' implies that the transcoder 2 is not to alter the content field received from the server 1;

'critical' implies that the field must be sent to the requesting client 3 from the transcoder 2;

'non-critical' implies that the transcoder 2 may delete the content field from the content forwarded to the requesting client 3.

The server 1 may issue a policy statement pol(S) which contains the set of security and transcoding labels, $L_s(S)$ and $L_t(S)$ respectively, and also a clear statement as to how the labels are to be interpreted. Since the policy statement pol(S) contains no security-sensitive information, it can be retrieved at any time from the server 1, and cached for later use in a connection to the server 1 for content retrieval.

Here it is assumed that the translation policy has been chosen such that it follows the rules of the policy information 17 already known and accessible for the transcoder 2. Therefore no policy statement pol(S) need be issued here. The known policy information 17 can e.g. be a commonly used policy, a sort of standard which hence might be known to many transcoders, senders and receivers, such that creating and submitting the policy information 17 is not necessary for a sender.

Given a field decomposition $f_1, f_2, \ldots, f_N$ for the content D, the server 1 then encodes each field $f_i$ in a field label tuple as $$L(f_i) = <L_s(f_i), L_t(f_i), [H(f_i)]> \quad (3)$$

where $L_s(f_i)$ and $L_t(f_i)$ are defined as described above, and H( . . . ) is a cryptographic hash function, also called hashing information or hash, such as the algorithm SHA-1. The hash function $H(f_i)$, which is applicable to no, one ore more of the fields $f_i$ is also referred to as piece hashing information part of the information data piece and is specified in square brackets as $[H(f_i)]$ to indicate that it is an optional field. As explained further below, a hash of a field is included in its field label tuple if the contents of the field are to be verified by the requesting client 3, meaning that the field data will be sent unencrypted with no transcoding done.

The security- and transcoding labels $L_s(f_i)$, $L_t(f_i)$ may in general consist of a list of values from $L_s$ and $L_t$. For example, using $L_t$ as defined in (1), a transcoding label for a field $f_i$ may be $$L_t(f_i) = \{\text{transcodable, non-critical}\} \quad (4)$$

meaning that the transcoder 2 may choose whether a representation of $f_i$ is to be sent to the requesting client 1, and further the transcoder 2 may choose this representation. For a field $f_i$ with subfields $f_{i,1}, f_{i,2}, \ldots, f_{i,ni}$, the encoding scheme in (2) is applied recursively to give $$L(f_i) = <L_s(f_i), L_t(f_i), L(f_{i,1}), L(f_{i,2}), \ldots, L(f_{i,ni}), [H(f_i)]> \quad (5)$$

and if $H(f_i)$ is required, it is computed over the field and all its subfields.

The labeling can be done by some labeling means which is fed with the necessary information for knowing which part of the information data 9 is to be encrypted and which part may be subjected to which type of transcoding. Therefore the labeling means uses as input the information data pieces which come out of the divisor means 21. The order of the labels will hence be chosen according to the order of the information data pieces, to facilitate a later assignment of the labels to the corresponding information data pieces, namely in the transcoder 2 and the receiver 3. The labeling means or labeler can be fed with user preferences to give the labeler an input about which information data pieces shall be encrypted and/or transcoded and how. So labeling can depend on some automatic system which automatically assigns the respective labels, e.g. following some implemented rules and/or depend on given rules or individual labeling preferences, given by a user or derived from a list. Sometimes labeling can be done by following a fixed labeling scheme and sometimes a individualized labeling list might be the optimum solution to tell the labeler which label value it has to stick to which information data piece.

Herein the group of all security labels is referred to as group of piece security information parts, denoted with SIL, while the group of transcoding labels is referred to as group of piece transcoding-type information parts, denoted with TIL. With other words, each field, respectively information data piece, has its piece security information part, whereby all piece security information parts together form the security information. The security information can be split up into the group of all security labels and the corresponding translation policy information. Hence, for each field the piece security information part can be also split up into the security label and the corresponding translation policy information, short policy information.

The TIL together with the corresponding policy information forms the transcoding-type information 13, which in the FIGURE is depicted in a simplified form. The SIL together with the corresponding policy information forms the security information 12, which in the FIGURE is also depicted in a simplified form. The principle is that the transcoder 2 shall be provided with all information needed for performing the transcoding according to the sender's wish which is expressed in a form that the transcoder 2 can understand and interpret for correct execution. This means that the security information 12 and the transcoding-type information 13 are transmitted to the transcoder 2 either in the label form which implies that the transcoder 2 understands the labels, either because the transcoder 2 already has the corresponding translation policy available, or is designed to understand the labels directly or is or has been provided with the policy information 17 by the sender 1 or by any other institution, or that in the case, a policy-label split version is not desired or realizable for whatever reason, the non-labeled security information 12 and the non-labeled transcoding-type information 13 are transmitted to the transcoder 2 such that the transcoder 2 needs no policy information for direct execution of the transcoding according to the received security information 12 and transcoding-type information 13.

After the labeling is complete for the content D, the server 1 is able to represent the content D as $$\operatorname{sum}(D) = <L(f_1), L(f_2), \ldots, L(f_N)> \quad (6)$$

which is herein called the content summary of D, also called security- and transcoding type information packet 11, denoted by sum(D). The labels are hence put together in the content summary sum(D) which function is here performed by a packetizer 23. The server 1 then signs sum(D) as sign(sum(D)), hence produces a signature 10, denoted in the FIGURE with SIG, using the signature generator 22, to indicate in a verifiable fashion a summary of the data in the content D, The summary of the content D is signed, not the content D itself, since the labeling schemes in formulas (2) and (3) do not include the actual data of any field. The content summary sum (D) is a compact way of representing the data comprising a piece of content, which can be verified by checking the signature sign(sum(D)).

The packetizer function and labeler function can be also combined in one.

The security- and transcoding type information packet 11 is transmitted to the transcoder 2. Also the encrypted confidential information data 14 and the non-confidential information data 15 is transmitted to the transcoder 2. With other words, the information data 9 is sent in a subdivided and partly encrypted form to the transcoder 2.

To explain how secure and verifiable transcoding is performed, a scenario is considered where the client 3 and the server 1 have established a secure session for end-to-end encryption under an encryption key K. The content D received by the client 3 is to be filtered through a transcoder service T.

For each piece of the content D that is requested, the server 1 consults the content summary sum(D), and for each field $f_i$ examines its field label tuple $L(f_i)$ as found in the content summary sum(D). If the content D contains security-sensitive information then some or potentially all of the fields will have a security label of 'secure'.

Without loss of generality it is assumed that the first j fields $f_1, f_2, \ldots, f_j$ are labeled as secure, while the remaining fields $f_{j+1}, f_{j+2}, \ldots, f_N$ are labeled as non-secure. The server 1 then forwards the following tuple to the transcoder 2:

$$<\operatorname{sum}(D), \operatorname{sign}(\operatorname{sum}(D)), E_K(d(f_1)), \ldots, E_K(d(f_j)), d(f_{j+1}), \ldots, d(f_N)> \quad (7)$$

where $d(f_i)$ is the data associated with field $f_i$, and $E_K(d(f_i))$ is the encryption of the data associated with field $f_i$ under the encryption key K. The data of each secure field is encrypted individually.

The transcoder 2 comprises decision means 4, denoted with TC, for deciding which part of the received partly encrypted information data 14, 15 is to be transcoded before transmitting it to the receiver 3.

Hereby the encrypted confidential information data 14 is only transcodable without using its content while the non-confidential information data 15 is transcodable, having access to its content.

In principle, transcoding means that the received encrypted confidential information data 14 is reduced in its size or complexity. This can be done in various levels, such as a very strong transcoding, resulting in an absolutely minimized version of the encrypted confidential information data 14 and the non-confidential information data 15, and to the opposite a rather lean transcoding, reducing the encrypted confidential information data 14 and the non-confidential information data 15 only to some minor extent. Transcoding can comprise data compression or partial data deletion. Here, the security- and transcoding type information 12, 13 is read from the security- and transcoding type information packet 11 and used for transcoding the encrypted confidential information data 14 and the non-confidential information data 15 leading to transcoded encrypted confidential information data 24, denoted with TECD, and transcoded non-confidential information data 25, denoted with TNCD.

The transcoder 2 here operates on the received data stream 14, 15 in two passes. In the first pass, the transcoder serializes the data by removing subfield structure from each field. For example, if $f_i$ is a field and $f_{i,j}$ a subfield of $f_i$, this serializing can be thought of as performing the following operation $$d(f_i) = <..,d(f_{i,j}),..> ---- > <.<ptr>,.>,ptr:<d(f_{i,j})>. \quad (8)$$

The serialization operates by replacing subfield data with a pointer to where the subfield data can be found in the data stream. This leads to a straightforward, denested representation of the hierarchical data structure.

In the second pass, the transcoder 2 examines the non-secure fields $f_{j+1}, f_{j+2}, \ldots, f_N$ and performs any appropriate transcoding, the output of which is denoted by $T(f_{j+1}, f_{j+2}, \ldots, f_N)$. For any non-critical field $f_i$ that is being removed from the final data stream after transcoding, the transcoder also examines $d(f_i)$. If $d(f_i)$ contains a pointer to subfield data, this data is also removed. If a transcodable field to be removed contains a secure, encrypted subfield then the removal of the subfield data alters $E_K(d(f_1)), \ldots, E_K(d(f_j))$, such that $T(E_K(d(f_1)), \ldots, E_K(d(f_j)))$ denotes the list of encrypted fields after any deletions due to transcoding have been made.

Finally, the transcoder 2 forwards the following 4-tuple to the requesting client 3:

$$<\text{sum}(D), \text{sign}(\text{sum}(D)), T(E_K(d(f_1)), \ldots, E_K(d(f_j))),$$
$$T(d(f_{j+1}), \ldots, d(f_N))>. \quad (9)$$

The receiver 3 comprises an integrity-check means 6 which operates on the signature 10 and delivers as integrity check output 19 an integrity check information, which indicates whether the security- and transcoding type information packet 11 has been amended in its content between the sender 1 and the receiver 3 or not. The receiver further comprises a policy information interpreter 8 which helps under use of the policy information 17 to interpret the transcoding type information labels 13 and the security information labels 12. This policy information interpreter 8 is not needed, if the receiver already understands the label language. On the other hand such a policy information interpreter 8 is also usable in the transcoder 2 if he does not understand the label language but makes use of the policy information 17.

The interpreted labels are then used by a comparison means 7 to see whether the transcoded encrypted information data 24 and the transcoded non-confidential information data 25 has been transcoded and treated according to the rules contained in the labels. The result is an indicator output 27 for whether the received transcoded information data 24, 25 is reliable or not. Finally, the transcoded encrypted information data 24 is decoded with a decryptor 26 which gives as decryptor output 18 the decoded confidential information data. The transcoded non-confidential information data 25 needs no further operation and is given directly as transcoded non-confidential information data output 20.

The structure of the original content D as it existed on the server 1 is represented in sum(D), which the client 3 can verify by checking the server's signature sign(sum(D)) on sum(D). Thus the client 3 is able to determine the set of fields that represent D, as specified by the server 1. Further, since the security- and transcoding type information packet sum(D) contains the label tuples for each field of the content D, the client 3 may verify the labeling that the server 1 chose for the fields of the content D. In particular, the client 3 can determine which fields were designated as secure by the server 1, and which were designated as transcodable by the server 1.

The client 3 then checks that all fields that were specified in the security- and transcoding type information packet sum(D) as secure and critical, have not been deleted or modified by the transcoder 2 in the transcoded encrypted information data $T(E_K(d(f_1)), \ldots, E_K(d(f_j)))$. Here, at least part of this verification is provided by the encryption algorithm E which may include authentication information about the data that was encrypted.

Also, the client 3 can compare the set of transcodable fields as specified in sum(D) with the received fields $T(d(f_{j+1}), \ldots, d(f_N))$ to verify that the transcoding process has not deleted or inappropriately modified any content that could be represented at the client 3.

The invention claimed is:

1. A method of transmitting information data from a sender to a receiver via a transcoder, said information data comprising confidential information data and non-confidential information data, characterized in that said confidential information data is encrypted, wherein security information and transcoding-type information is sent together with the partly encrypted information data to said transcoder, said transcoder having access to the security information and the transcoding type information for potential use, whereby the encrypted confidential information data is transcoded without using its content while said non-confidential information data is transcoded, having access to its content, said transcoder in said transcoding step deciding which part of said partly encrypted information data is to be transmitted to said receiver and/or to be altered before transmittal.

2. A method according to claim 1, characterized in that the partly encrypted information data s accompaniable by a hashing-information allowing content-verification at the receiver of at least part of said partly encrypted information data.

3. A method according to claim 1 or 2, characterized in that the information data is subdivided into information data pieces before encrypting and transmitting.

4. A method according to claim 3, characterized in that each information data piece is assigned its own piece security information part and piece transcoding-type information part.

5. A method according to claim 4, characterized in that at least one of the information data pieces is assignable its own piece hashing-information part, said information data piece being preferably part of said non-confidential information data.

6. A method according to claim 5, characterized in that the piece security information parts and piece transcoding-type information parts are translated into labels (SIL, TIL) according to a translation policy, that instead of said piece security information parts and piece transcoding-type information parts, said labels (SIL, TIL) are transmitted to said transcoder, whereby a policy information, explaining how to interpret said labels (SIL, TIL), is made available or is already available to the transcoder.

7. A method according to claim 6, characterized in that the labels (SIL, TIL) are combined in a security- and transcoding-type information packet which is completed by a signature allowing content-integrity-verification at the receiver.

8. A method of transcoding in a transcoder partly encrypted information data received from a sender and to be transmitted to a receiver, whereby said partly encrypted information data comprised non-confidential information data and encrypted confidential information data, and is accompanied by security information and transcoding-type information, said transcoder having access to said security information and transcoding-type information for potential use before transcoding and transmittal of the partly encrypted information, whereby said encrypted confidential information data may only be transcoded without using its content while said non-confidential information data may be transcoded, having access to its content.

9. A method according to claim 8, characterized in that the partly encrypted information data is received subdivided into information data pieces.

10. A method according to claim 9, characterized in that each information data piece has assigned its own piece security information part and piece transcoding-type information part.

11. A method according to claim 10, characterized in that the piece security information parts and piece transcoding-type information parts arrive in the form of labels (SIL, TIL) and that for transcoding, a policy information which is available to the transcoder is used, which explains how to interpret said labels (SIL, TIL).

12. A method according to claim 11, characterized in that the labels (SIL, TIL) are received combined in a security- and transcoding-type information packet which is completed by a signature allowing content-integrity-verification at the receiver.

13. A method for receiving from a transcoder in a receiver transcoded partly encrypted information data comprising transcoded non-confidential information data and transcoded encrypted confidential information data, furthermore receiving together with said transcoded partly encrypted information data, security information and transcoding-type information which may be used for comparing it with said transcoded partly encrypted information data for testing the compliance of the transcoding with said security information and transcoding-type information.

14. A method according to claim 13, characterized in that the partly encrypted information data is accompaniable by hashing-information allowing content-verification at the receiver of at least part of said transcoded partly encrypted information data.

15. A method according to claim 13 or 14, characterized in that the transcoded partly encrypted information data is received subdivided into information data pieces.

16. A method according to claim 15, characterized in that at least one of the information data pieces is assignable its own piece hashing information part, said information data piece being preferably part of the non-confidential information data.

17. A method according to claim 16, characterized in that the piece security information parts and piece transcoding-type information parts arrive in the form of labels (SIL, TIL) and that a policy information which is available to the receiver is used to interpret said labels (SIL, TIL) and that thereby the correctness of the transcoding is tested.

18. A method according to claim 17, characterized in that a content-integrity-verification of a security and transcoding-type information packet comprising the labels (SIL, TIL) is performed using a signature thereof.

19. A sender for transmitting information data to a receiver via a transcoder, which transcodes said information data comprising confidential information data and non-confidential information data, characterized in that said sender comprises an encryptor for encrypting said confidential information data, and that together with the partly encrypted information data to said transcoder, security information and transcoding-type information is sendable, being usable for said transcoding, whereby said encrypted confidential information data is transcodable without using its content while said non-confidential information data is transcodable, having access to its content.

20. A sender according to claim 19, characterized in that it comprises divisor means for subdividing the information data into information data pieces before encrypting and transmitting.

21. A sender according to claim 20, characterized in that each information data piece has assigned its own piece security information part and piece transcoding-type information part and that instead of said piece security information parts and said piece transcoding-type information parts, to said transcoder, labels (SIL, TIL) are transmittable, into which according to a translation policy, said piece security information parts and said piece transcoding-type information parts are translatable, whereby a policy information, explaining how to interpret said labels (SIL, TIL), is deliverable or is already available to the transcoder.

22. A sender according to claim 21, characterized in that it comprises a packetizer for combining the labels (SIL, TIL) in a security- and transcoding-type information packet and signature-generator for completing said packet by a signature, which allows content-integrity-verification at the receiver.

23. A transcoder for transcoding partly encrypted information data received from a sender and for transmitting the transcoded partly encrypted information data to a receiver, said received partly encrypted information data comprising non-confidential information data and encrypted confidential information data, and being accompanied by security information and transcoding-type information, said transcoder comprising decision means for deciding which part of said received partly encrypted information data is to be transcoded before transmitting it to said receiver, whereby said encrypted confidential information data is only transcodable without using its content while said non-confidential information data is transcodable.

24. A transcoder according to claim 23, characterized in that the partly encrypted information data is received subdivided into information data pieces and that said each information data piece has assigned its own piece security information part and piece transcoding-type information part, which arrive in the form of labels (SIL, TIL) and that for transcoding, a policy information which is available and which explains to the transcoder how to interpret said labels (SIL, TIL), is usable.

25. A receiver for receiving transcoded partly encrypted information data from a sender via a transcoder, said transcoded partly encrypted information data comprising non-confidential information data and encrypted confidential information data, furthermore for receiving together with said transcoded partly encrypted information data, security information and transcoding-type information, comprising comparison means for comparing said security information and said transcoding-type information with said transcoded partly encrypted information data for testing the compliance of the transcoding.

26. A receiver according to claim 25, characterized in that the transcoded partly encrypted information data is received subdivided into information data pieces, that the piece security information parts and piece transcoding-type information parts arrive in the form of labels (SIL, TIL) and that with the comparison means, under use of a policy information which is available to said receiver and a policy information interpreter, said labels (SIL, TIL) are interpretable and that thereby the correctness of the transcoding is testable.

27. A receiver according to claim 26, characterized in that a content-integrity-verification of a security and transcoding-type information packet comprising the labels (SIL, TIL) is performable with an integrity-check means using a signature of said packet.

* * * * *